(12) United States Patent
Korcz et al.

(10) Patent No.: US 10,033,173 B2
(45) Date of Patent: Jul. 24, 2018

(54) MASONRY BOX POSITIONING SUPPORT

(71) Applicant: Hubbell Incorporated, Shelton, CT (US)

(72) Inventors: Krzysztof W. Korcz, Grainger, IN (US); Steven J. Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/688,007

(22) Filed: Aug. 28, 2017

(65) Prior Publication Data

US 2017/0358912 A1 Dec. 14, 2017

Related U.S. Application Data

(63) Continuation of application No. 15/441,580, filed on Feb. 24, 2017, now Pat. No. 9,748,752, which is a continuation of application No. 14/204,491, filed on Mar. 11, 2014, now Pat. No. 9,608,419.

(51) Int. Cl.
*H02G 3/12* (2006.01)
*F16M 13/02* (2006.01)
*F16B 2/24* (2006.01)

(52) U.S. Cl.
CPC ............. *H02G 3/121* (2013.01); *F16B 2/243* (2013.01); *F16M 13/02* (2013.01)

(58) Field of Classification Search
CPC ........... H02G 3/08; H02G 3/081; H02G 3/12; H02G 3/121; H02G 3/123; H05K 5/00; H05K 5/02; H05K 5/0204; F16M 13/02; F16M 13/00; Y10T 29/49872; F16B 2/243

USPC ... 174/480, 481, 482, 483, 490, 503, 50, 53, 174/57, 58, 54, 61; 220/3.2–3.9, 4.02; 248/906, 343; 52/220.1
See application file for complete search history.

(56) References Cited

U.S. PATENT DOCUMENTS

| | | | |
|---|---|---|---|
| 2,581,755 A | 1/1952 | Dieffenderfer | |
| 2,665,865 A | 1/1954 | Bell | |
| 2,736,450 A | 2/1956 | Atkinson | |
| 3,184,191 A | 5/1965 | Esoldi | |
| 3,337,168 A | 8/1967 | Albrecht | |
| 3,362,667 A | 1/1968 | Ginsburg | |
| 4,183,486 A | 1/1980 | Esoldi | |
| 4,226,393 A * | 10/1980 | Rardin | H02B 1/044 174/58 |
| 4,669,371 A | 6/1987 | Sarazen, Jr. | |

(Continued)

*Primary Examiner* — Angel R Estrada
(74) *Attorney, Agent, or Firm* — Michael Best & Friedrich, LLP

(57) ABSTRACT

An electrical box support is provided for coupling to the side wall of an electrical box to support the electrical box in an opening formed in a hollow core building block. The support has a flange at the front edge and tab at a front edge that clips onto the side wall of the electrical box. A spring member extends from a rear side edge and curls toward the front edge. The spring member has an end that is directed toward the front edge and spaced from the flange a distance to contact the inner surface of the block while the flange contacts the outer surface of the block. The tab at the front edge of the support has a hook for engaging an inner edge of the electrical box to couple the support to the electrical box and to prevent sliding of the support on the electrical box.

19 Claims, 10 Drawing Sheets

(56) References Cited

U.S. PATENT DOCUMENTS

| | | | | |
|---|---|---|---|---|
| 4,693,438 A * | 9/1987 | Angell | ............... | H02G 3/123 |
| | | | | 174/58 |
| 5,005,792 A * | 4/1991 | Rinderer | ............ | H02G 3/125 |
| | | | | 248/906 |
| 5,494,244 A | 2/1996 | Walton | | |
| 5,661,264 A | 8/1997 | Reiker | | |
| 6,648,277 B2 | 11/2003 | De Leu | | |
| 7,082,728 B1 * | 8/2006 | McConaughy | ...... | H02G 3/121 |
| | | | | 174/50 |
| 7,455,266 B2 | 11/2008 | Faircloth | | |
| 7,462,775 B1 | 12/2008 | Gretz | | |
| 8,109,054 B2 | 2/2012 | Thomas et al. | | |
| 8,220,761 B2 | 7/2012 | Brockelsby | | |
| 9,300,119 B2 * | 3/2016 | Korcz | ............... | H02G 3/121 |
| 9,608,419 B2 * | 3/2017 | Korcz | ................. | H02G 3/12 |
| 2014/0318853 A1 | 10/2014 | Korcz et al. | | |

* cited by examiner

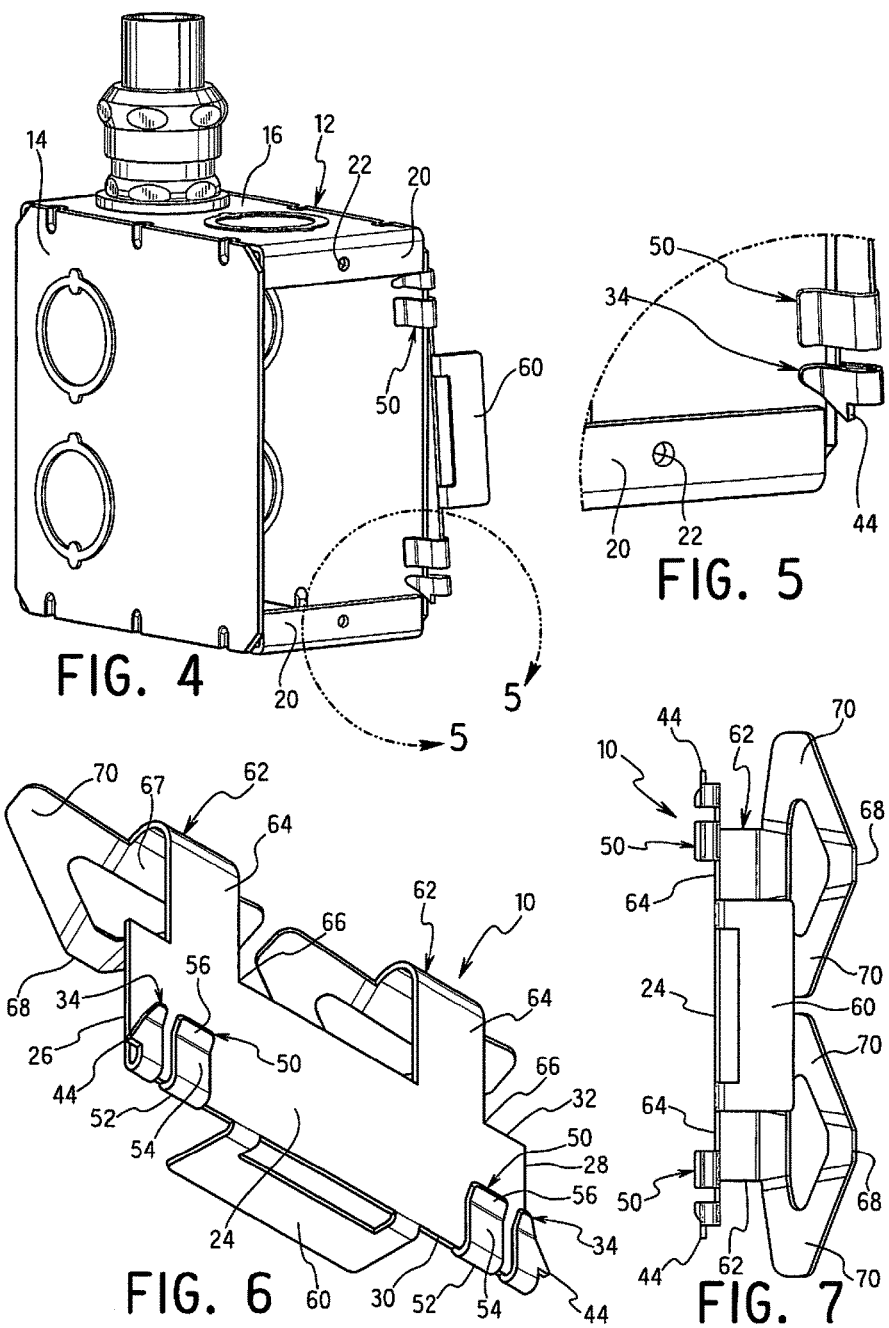

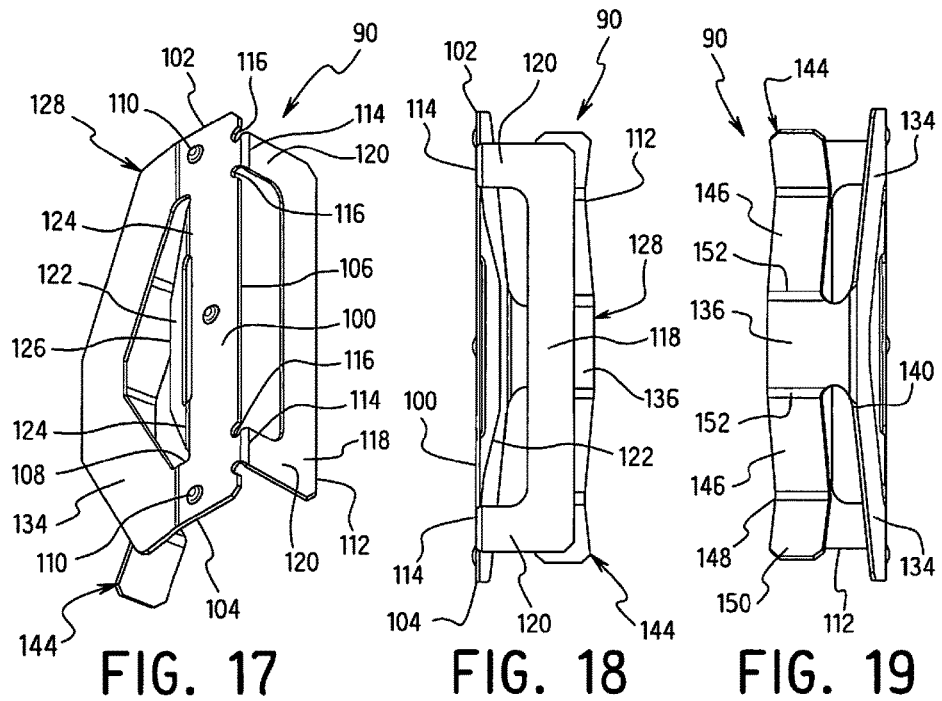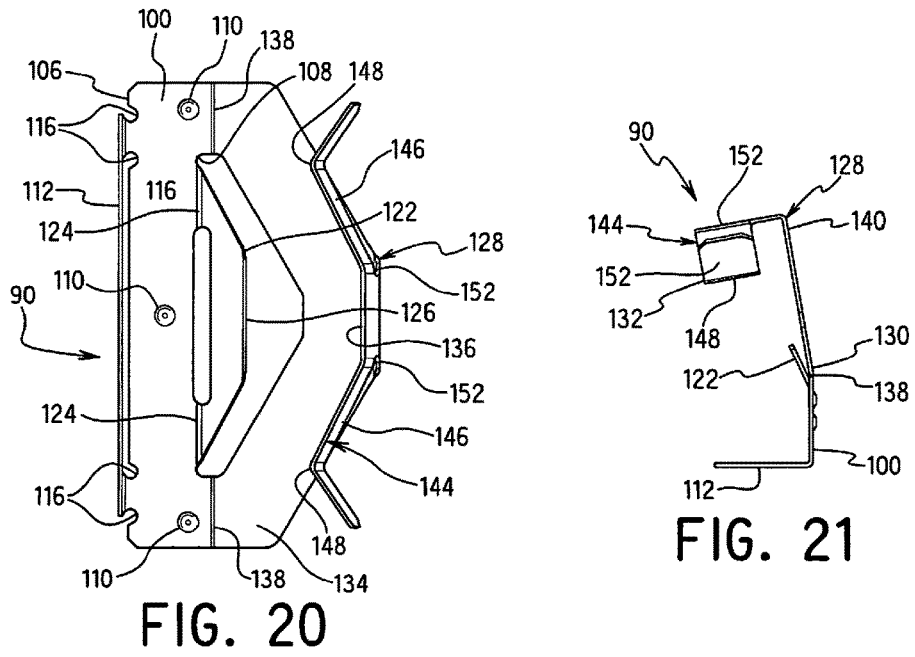

MASONRY BOX POSITIONING SUPPORT

CROSS-REFERENCE TO RELATED APPLICATION

This application is a continuation of co-pending, prior-filed U.S. patent application Ser. No. 15/441,580, filed Feb. 24, 2017, which is a continuation of U.S. patent application Ser. No. 14/204,491, filed Mar. 11, 2014, now U.S. Pat. No. 9,608,419. The entire contents of these documents are hereby incorporated by reference.

FIELD

The present invention is directed to a support bracket for mounting an electrical box. In particular, the invention is directed to an electrical box support for supporting and positioning an electrical box in an opening in a hollow core building block and to a method for mounting the electrical box.

BACKGROUND

During construction of a wall it is desirable to mount an electrical junction box in a manner so that the electrical junction box does not move or shift during construction of the wall and during use after completion of the structure. Numerous mounting devices have been proposed for permanently and/or temporarily mounting electrical boxes in the cavity of a wall during construction.

The standard outlet boxes often require mechanical fasteners to secure the electrical box permanently in place to a wall stud or other support structure. The mechanical fasteners are usually positioned to orient the electrical box in the desired location so that the outer edge of the electrical box is flush with the outer face of the wall.

The mounting of electrical boxes in concrete structures generally requires a different mounting assembly for holding the electrical box in position while the wall is being formed. In addition, concrete wall and building block walls do not enable the usual fasteners that are used in wood walls and studs since nail, screws and other fasteners cannot be easily driven into the wall. Electrical boxes are required to be secured to the wall to prevent movement of the box after installation. Hollow concrete blocks provide a particular difficulty in mounting electrical boxes since there are no surfaces that can readily accommodate fasteners.

Various methods have been proposed for mounting or supporting electrical boxes during construction of the concrete walls and block walls. One manner of mounting the electrical box is to provide a sheet metal form with various tabs that can hold the electrical box in position while the cement or mortar sets. These devices often require the device to be positioned between the joints during the construction of the wall which can interfere with the structural integrity of the joint. These devices also require the use of cement or mortar to hold the support in place.

Various devices and methods have been proposed for mounting an electrical box during construction. One example is disclosed in U.S. Pat. No. 2,581,755 to Dieffenderfer which discloses an electrical connection box having a bracket member for mounting to the outer sides of the walls of the box. The brackets are folded to form an outwardly projecting flange and overlap the front side of the wall. Slots are provided for receiving mounting screws to attach the bracket to the box. The bracket has inwardly projecting bendable arms with weakened zones and straps integral with the arms that are folded in a reverse direction. The electrical box and the brackets are inserted into the opening in the wall and the straps are folded outwardly causing the arms to bend and contact the inner surface of the wall.

U.S. Pat. No. 2,736,450 to Atkinson discloses an outlet box securing device. The securing device has a hook portion for contacting the outer edge of the electrical box, a flat portion extending from the hook portion and a spring arm forming a U-shaped loop. The spring arm has one end that contacts the inside surface of the opening to apply a spring force between the side edge of the opening in the wall and the electrical box.

U.S. Pat. No. 3,184,191 to Esoldi discloses an electrical box holder having legs formed in a U-shaped for engaging the open end of the electrical box. The center leg of the holder is pulled outwardly with respect to the electrical box causing the body of the holder to bend 90 degrees and contact the inner surface of the wall. The center leg is then folded over the edge of the electrical box.

U.S. Pat. No. 3,337,168 to Albrecht discloses an electrical box support having a pair of outwardly extending legs that are inserted through the opening in the wall to contact the inner surface of the wall. Tabs are then folded over the front edge of the electrical box to secure the electrical box in place.

U.S. Pat. No. 3,362,667 to Ginsberg discloses an electrical switch box support having an outer wall for contacting the outer surface of the wall and an inner wall contacting the inner surface of the wall and forming a channel therebetween. The body of the support includes tabs that are bent over the open edge of the electrical box to attach the electrical box to the support.

U.S. Pat. No. 4,183,486 to Esoldi discloses an electrical box holder that is inserted into the opening in the wall between the edges of the opening in the side wall of the electrical box. The holder includes a bendable and collapsible center portion and leg extensions on each side of the center portion. The leg extensions extend beyond the front face of the electrical box and the wall and are pulled outwardly causing the center portion to bend and engage the inner surface of the wall.

U.S. Pat. No. 4,693,438 to Angell discloses an electrical box retainer having a U-shaped clip like member having an outwardly extending spring biased flange. The spring biased flange is inserted between the outer edge of the electrical box and the opening in the wall to contact the inner surface of the wall. The main body of the clip is bent over the inner edge of the electrical box.

U.S. Pat. No. 4,669,371 to Sarazen et al. discloses a mounting spring for a foundation vent. The spring clips to the front edge of the vent and has a pair of spring biased legs to contact the inner edge of the opening in the wall.

U.S. Pat. No. 5,494,244 to Walton discloses a similar mounting clip for an air diffuser. The mounting clip has a U-shaped portion that slides onto the inner edge of the opening in the wall and an inwardly extending leg to contact the outer surface of the vent.

U.S. Pat. No. 5,661,264 to Reiker discloses an electrical box having a U-shaped mounting bracket is attached to the rear wall of the electrical box. The mounting bracket has outwardly extending legs for supporting the electrical box.

U.S. Pat. No. 6,648,277 to De Leu discloses an electrical box mounting strap for supporting an electrical box within a cavity of the concrete block. The mounting strap has a configuration to conform to the surface of the cavity of the block and has a leg portion to support the rear and side walls of the electrical box to prevent the electrical box from moving inwardly into the cavity of the concrete block.

U.S. Pat. No. 7,455,266 to Faircloth discloses an electrical conduit support for use in concrete block. The support has a main body portion with a plurality of openings for receiving the conduits and outwardly extending tabs or flanges that contact the upper surface of the concrete block and is captured between the adjacent concrete blocks.

U.S. Pat. No. 8,109,054 to Thomas et al. discloses a fastener for an electrical box within a concrete block. The fastener has a front portion, a center portion and an end portion. The end portion and the center portion of the fastener are inserted through the utility box with part of the end portion extending beyond the back surface of the utility box. The front portion rests across the front surface of the utility box. The end portion is secured against the back surface of the utility box to maintain the position of the utility box within the wall.

While the prior devices are generally suitable for their intended purpose there is a continuing need in the industry for improved methods and devices for mounting electrical boxes during construction of concrete and block walls.

SUMMARY

The present invention is directed to a method and to a device for mounting an electrical box in a wall or other support structure. The invention is particularly directed to a bracket or support for positioning an electrical box in the cavity of a hollow core building block, such as a hollow concrete building block or masonry wall.

Accordingly, an object of the invention is to provide a support member for supporting an electrical box in an opening of a building block during construction of a wall or other structure.

Another feature of the invention is to provide a support that can be coupled directly to a standard electrical box and is able to support the electrical box and position the electrical box in an opening in a building block.

The electrical box support of the invention is particularly suitable for mounting and positioning the electrical box in an opening formed in a hollow core cement building block. The support is able to attach directly to the electrical box and to attach the electrical box to the block without interfering with the construction of the wall and without the use of cement, mortar, adhesives or fasteners to hold the support and the electrical box in place. After completion of the wall or other structure, the mortar used in the construction can be used to fix the electrical box within the opening in the block.

The electrical box support in one embodiment of the invention has a tab that can clip onto a wall of the electrical box to fix the support to the electrical box. The tab can have a hook, projection or barb that can engage a surface of the electrical box to attached the support to the electrical box and prevent movement of the support relative to the electrical box. In other embodiments, the support is attached to the electrical box by welding.

The electrical box support is a one-piece unitary member formed from sheet steel or other material that is cut and bent to the finished form. The support can be made of other material, such as plastic, that is sufficiently strong and resilient to support the electrical box.

Accordingly, one feature of the invention is to provide a support that is easily assembled with the electrical box and can easily slide and fit into the opening formed in a building block for supporting the electrical box. The support of the invention can be attached to a standard electrical box as known in the art without the need to modify the box.

Another feature of the invention is to provide a support for an electrical box having an outwardly extending spring biased tab configured for contacting the inner surfaces of the opening in a building block for retaining and positioning the electrical box within the opening during the construction of a wall or other structure. In one embodiment of the invention, the support has an outwardly extending flange for contacting the outer surface of the building block and a spring member for contacting the inner surface of the building block where the spring biased tab is positioned between the flange and the spring member.

Another feature of the invention is to provide a support for an electrical box to position the electrical box within an opening in a building block where the support has a removable or separable flange for contacting the outer surface of the building block to position the electrical box during construction. After installation of the electrical box and construction of the wall or other structure, the flange can be separated from the support. In one embodiment, the flange connected to the support by a frangible portion forming a break line so that the flange can be separated from the support by bending along the break line.

The various features and aspects of the invention are basically attained by providing an electrical box support for mounting an electrical box in an opening of a hollow core building block. The support comprises a substantially planar body configured for mating with a first side wall of the electrical box. The body has a first longitudinal end, a second longitudinal end, a first side edge and a second side edge. A tab extends from the first side edge of the body and is configured for coupling the support to an open edge of the first side wall of the electrical box to position the first side edge of the body adjacent to the open outer edge of the electrical box. A flange is coupled to the first side edge of the body and extends substantially perpendicular to a plane of the body opposite the tab and has a dimension to contact an outer surface of the block and to orient the outer edge of the electrical box at the outer surface of the block. A spring member having a first end coupled to the second side edge of the body and a first leg portion extending away from the body. A second contact end of the spring member extends towards the flange. The second contact end is spring biased toward the flange and is positioned to contact an inner surface of the block to capture the block between the flange and the second end of the spring member and support the electrical box in a hollow cavity of the block.

The features of the invention are also attained by providing an electrical assembly comprising an electrical box and support. The electrical box has a first and a second side wall, a first and second end wall and an open front. The electrical box support has a body with a first longitudinal end, a second longitudinal end, a first side edge and a second side edge. A first tab extends from the first side edge of the body and is configured for coupling to the first side wall of the electrical box. A flange is coupled to the first side edge of the body and extends substantially perpendicular to a plane of the body. The flange has a dimension to engage an outer surface of a hollow core building block. A spring member has a first end coupled to the second side edge of the body and a second end that is spring biased towards the flange and has a dimension to engage an inner surface of the building block.

The features of the invention are also attained by a method of mounting an electrical box in an opening in a hollow core building block. The method comprises the steps of providing at least one electrical box support and an electrical box. The electrical box support has a substantially planar body having a first longitudinal end, a second longitudinal end, a first side edge and a second side edge. A spring member has a first end coupled to the second side edge of the body and extending away from the flange, and a second contact end extending towards the flange where the second contact end of the spring member is spring biased toward the flange. The electrical box and support assembly is positioned in an opening in the hollow core building block and the flanges are positioned against an outer surface of the block. The spring is biased into contact with an inner surface of the block to mount the electrical box with an open front edge substantially flush with the outer surface of the block.

These and other features of the invention will become apparent from the following detailed description of the invention, which taken in conjunction with the annexed drawings discloses various embodiments of the invention.

BRIEF DESCRIPTION OF THE DRAWINGS

The following is a brief description of the drawings, in which:

FIG. 4 is a perspective view of the support being coupled to the electrical box;

FIG. 5 is an enlarged sectional view of the FIG. 4 showing the coupling tab of the support;

FIG. 6 is a perspective view of the support in one embodiment of the invention;

FIG. 7 is a front view of the support of FIG. 6;

FIG. 17 is a perspective view of the support of FIG. 15;

FIG. 18 is a front view of the support of FIG. 17;

FIG. 19 is a rear view of the support of FIG. 17;

FIG. 20 is a side view of the support of FIG. 17;

FIG. 21 is an end view of the support of FIG. 17;

DETAILED DESCRIPTION OF THE INVENTION

The preset invention is directed to an electrical box support and to a method of mounting an electrical box in an opening in a structure such as a wall. The present invention is further directed to a support for retaining an electrical box in an opening formed in a hollow core masonry building block or an opening in a concrete wall.

Figure 1:
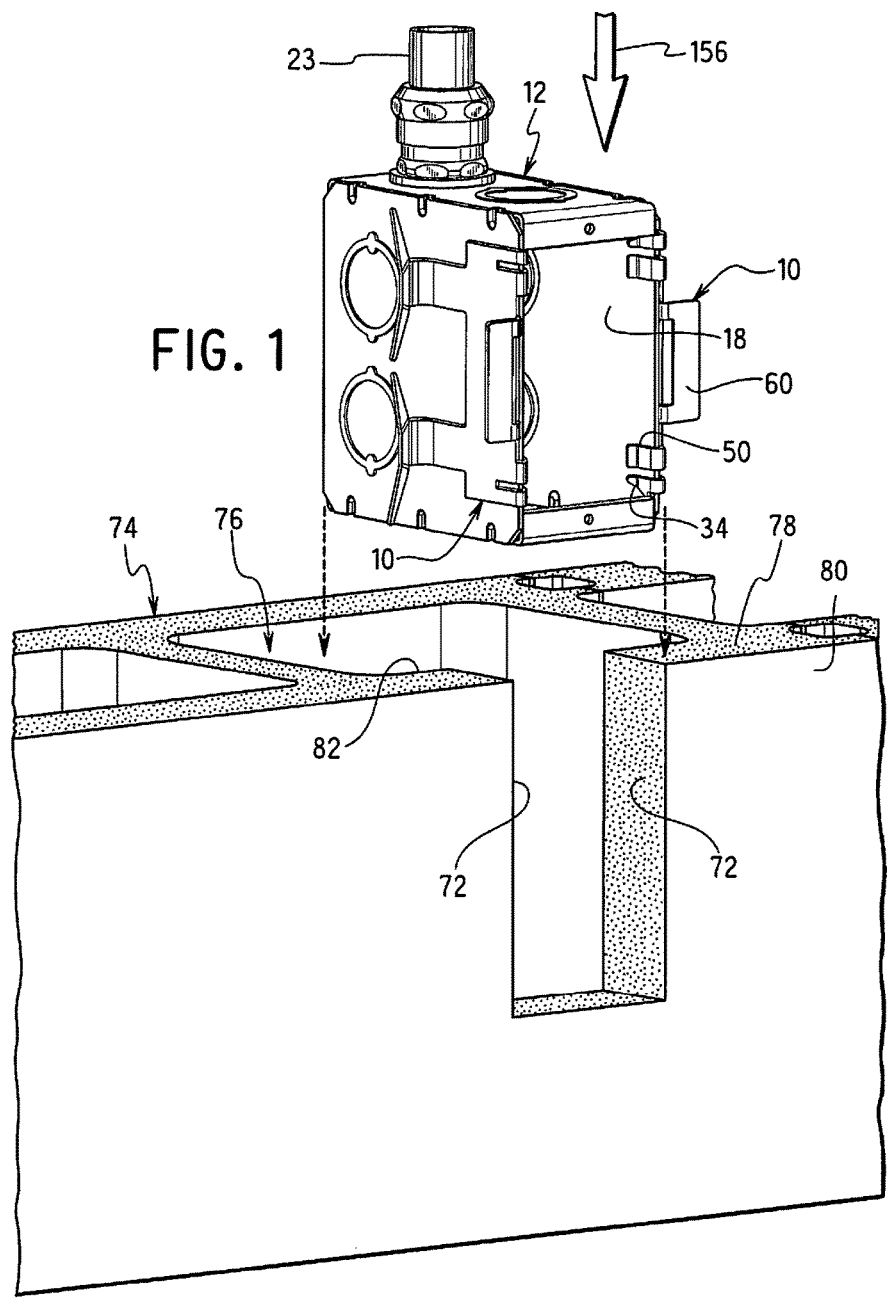
FIG. 1 is a perspective view of the support and electrical box assembly during installation in a building block in one embodiment of the invention.

Referring to the drawings, the invention includes an electrical box support 10 that can be attached to an electrical box 12 to form an electrical box assembly. The electrical box 12 can be a standard electrical box with standard dimensions and shapes. In the embodiment of FIG. 1, the electrical box 12 is a single gang box having a substantially rectangular configuration. In other embodiments, the electrical box can be a multi gang box as shown in the embodiments of FIGS. 11-14.

As shown in FIGS. 1-4, the electrical box 12 has a pair of side walls 14, end walls 16, a back wall and an open front 18 defined by the front edges of the side walls 14 and end walls 16. In the embodiment shown, the electrical box 12 includes a mounting flange 20 extending inwardly from each end wall 16 with a dimension for mounting the electrical device, such as a wall switch or receptacle. In the embodiment shown, the mounting flange 20 extends between the side walls 14 to form a lip projecting into the opening 18 in the electrical box. Each mounting flange 20 includes a screw hole 22 for receiving a mounting screw to attach the electrical device to the box. An electrical conduit 23 can be coupled to the electrical box 12 to supply wires to the electrical box and wiring device as known in the art.

For purposes of illustrating the features of the electrical box and support, the electrical device is not shown. It is to be understood that the electrical device can be any suitable electrical wiring device as known in the art that is commonly mounted to an electrical box.

Figure 2:
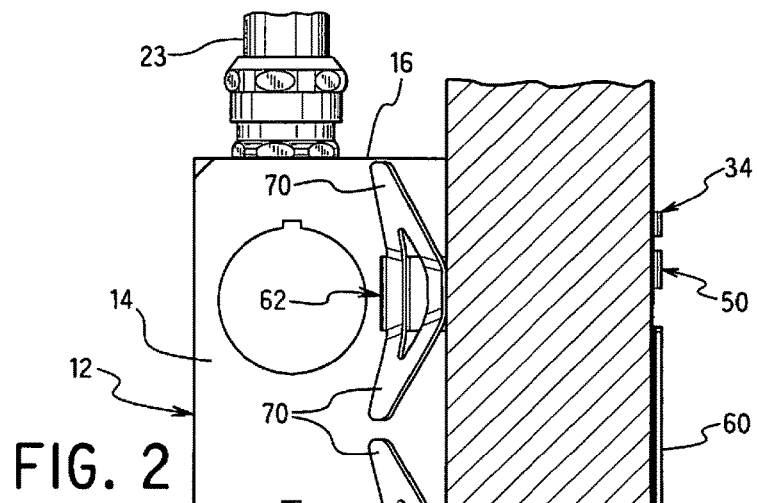
FIG. 2 is a side view of the support and electrical box installed in the building block.

Referring to FIGS. 5-10, the electrical box support 10 includes a body 24 which is substantially planar and has a substantially rectangular configuration for complementing the dimensions of the electrical box 12. The body 24 has a first longitudinal end 26, an opposite second longitudinal end 28, a first side edge 30 forming a front edge and a second side edge 32 forming the rear edge. As shown in FIG. 2, the body 24 has a dimension to complement the dimensions of the side wall of the electrical box 12 to lay flat against the side wall of the electrical box. In one preferred embodiment of the invention as shown in the drawings, two supports 10 are used in mounting the electrical box 12 where a support 10 is attached to each of the side walls 14. In preferred embodiments of the invention, the support 10 is coupled to at least one side wall 14 of the electrical box. In other embodiments, the support 10 can be coupled to one or more end walls or combinations of the end walls and side walls of the electrical box.

The support 10 in a preferred embodiment is made from sheet steel that is cut and folded to form the various tabs and flanges. Preferably, the steel has sufficient strength and resilience to secure the electrical box in the opening of the building block as discussed hereinafter in greater detail. Alternatively, the support can be made of other material such as a molded one-piece plastic material.

Figure 3:
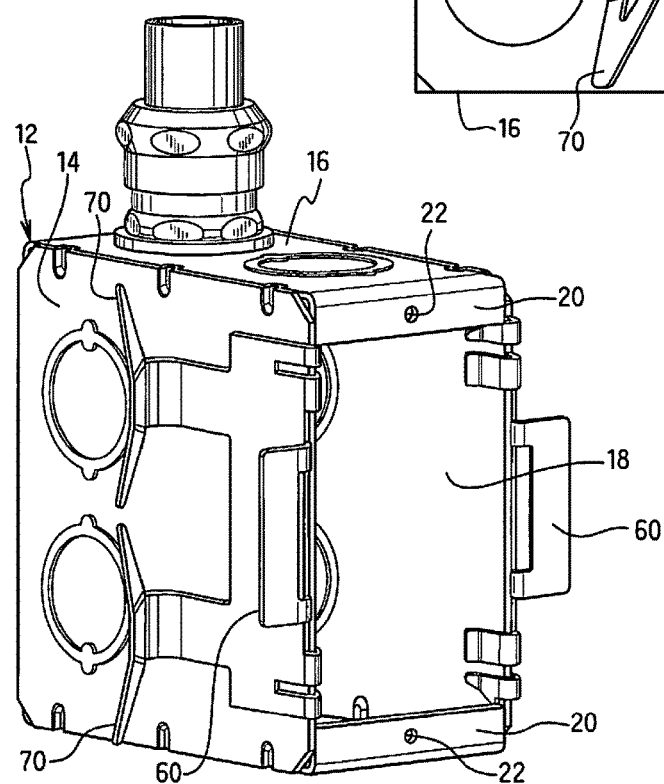
FIG. 3 is a perspective view of the support and electrical box assembly.
Figure 8:
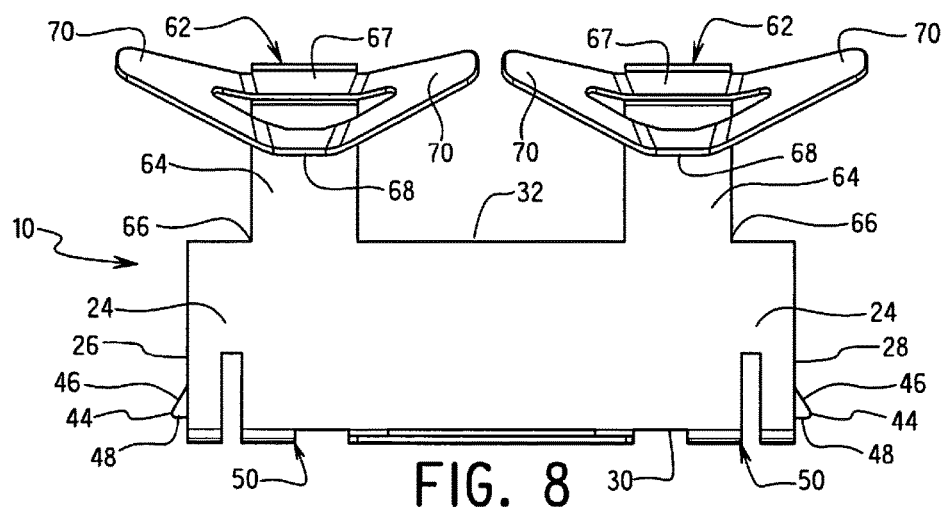
FIG. 8 is left side view of the support.

The support is preferably a one piece unitary member. A first tab 34 shown in FIG. 6 is provided for attaching the body 24 of the support 10 to a wall, such as the side wall 14 of the electrical box 12 as shown in FIGS. 3 and 4. In one preferred embodiment, two tabs 34 are provided at or near each end of the body 24 along the front edge 30. As shown in FIG. 6, the tab 34 is formed by a leg 36 with a substantially U-shape having a first end 38 attached to the edge 30 and a second end extending toward the second side edge 32. The main portion 40 of the leg 36 is oriented substantially parallel to the plane of the body 24 and is spaced from the body 24 a distance corresponding substantially to thickness of the side wall 14 of the electrical box 12 for coupling the support to the side wall 14 by a friction fit. The end portion 42 is bent away from the plane of the leg and the body 24 to form a guide and assist in sliding the support onto the side wall of the electrical box.

Figure 9:
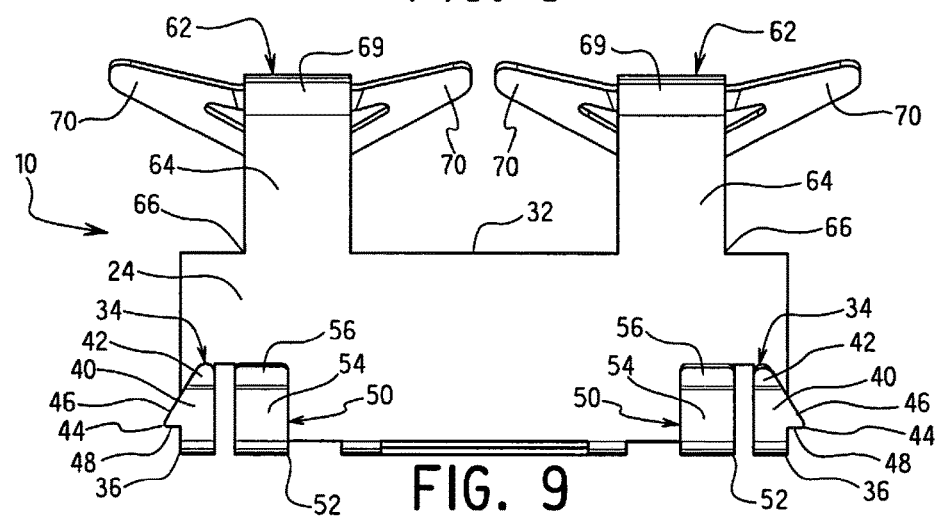
FIG. 9 is a right side view of the support.

The leg 36 has a projection or barb forming a hook 44 facing outwardly from the respective longitudinal end of the body 24. The hook 44 is formed by an inclined edge 46 and an undercut shoulder 48 extending substantially parallel to the front edge 30 of the body 24. In the embodiment shown, the hooks 44 and the tabs 34 are positioned next to or adjacent the respective longitudinal ends of the body and are spaced apart a distance to engage and coupled to the edge of the inwardly extending mounting flanges 20 of the electrical box 12 as shown in FIG. 4. The undercut shoulder 48 of the hook 44 in one embodiment engages an inner surface of the mounting flanges 20. The tabs 34 are preferably spaced apart a distance so that each tab 34 engages and is coupled to the mounting flanges 20 at the opposite ends of the electrical box 12 to limit sliding of the support 10 within the opening along the longitudinal dimension of the side wall of the electrical box. As shown in FIG. 9, the hook can extend outwardly from an end of the body 24. In alternative embodiments, the end walls of the electrical box can be formed with an aperture or detent that is positioned to engage the hooks 44 for coupling the supports 10 to the electrical box 12.

The support 10 in this embodiment of the invention is attached to the electrical box by sliding the tabs 34 over the edge of the electrical box so that the hooks snap onto or under the edges of the mounting flanges 20. Preferably, the tabs 34 are spaced apart a distance corresponding to the space between the mounting flanges 20 so that the edges of the tabs 34 contact the mounting flanges 20 to reduce or prevent sliding of the support along the length of the side wall of the electrical box 12. The hooks 44 also resist separation of the supports 10 from the electrical box 12 during installation and during use, such as when a force is applied to the electrical device and the electrical box 12 that could otherwise cause the electrical box to separate from the support. The hooks 44 couple to the electrical box to fix the position of the electrical box in the wall opening and prevent the electrical box from falling into the wall cavity during use.

In the embodiment shown in FIGS. 3-10, the body 24 of the support 10 includes a second tab forming a coupling tab 50 for attaching the support to the side wall of the electrical box. A coupling tab 50 is provided next to each of the tabs 34 at the ends of the side edge 30 of the body 24. In the embodiment shown, the coupling tabs 50 are spaced inwardly with respect to the tabs 34. The coupling tabs 50 are formed by a leg having a substantially U-shape with a first end 52 attached to the first side edge 26 and a second end extending toward the second side edge 28. A main portion 54 of the coupling tabs 50 is substantially parallel to the plane of the body 24 and spaced from the body 24 a distance corresponding to the thickness of the wall of the electrical box 12 so that the coupling tabs 50 grip the wall of the electrical box by a friction fit. An end portion 56 of each coupling tab 50 is angled away from the body 24 to assist in sliding the coupling tabs 50 onto the wall 14 of the electrical box 12 during installation. Preferably, the coupling tabs 50 and the tabs 34 are oriented so that the front edge 30 of the body is at or closely positioned to the front edge of the electrical box.

A flange 60 extends outwardly from the front edge 30 of the body 24 to position the support 10 and the electrical box 12 relative the wall of the support structure such as the building block 74 shown in FIG. 1 and FIGS. 11-14. The flange 60 extends substantially perpendicular to the plane of the body 24 in a direction opposite to tabs 34 and coupling tabs 50. In the embodiment shown, the flange 60 has longitudinal length less than the length of the body 24 and a width sufficient to contact the outer surface of the building block and stabilize the electrical box. In the embodiment shown, the flange 60 is formed by bending the sheet metal blank during manufacture of the support 10. In an alternative embodiment, the flange 60 can be formed as a tab extending parallel to the plane of the body 24. During installation of the electrical box, the support can be positioned in the opening in the block and then the flanges 60 can be bent flat against the surface of the block to the position shown.

Figure 10:
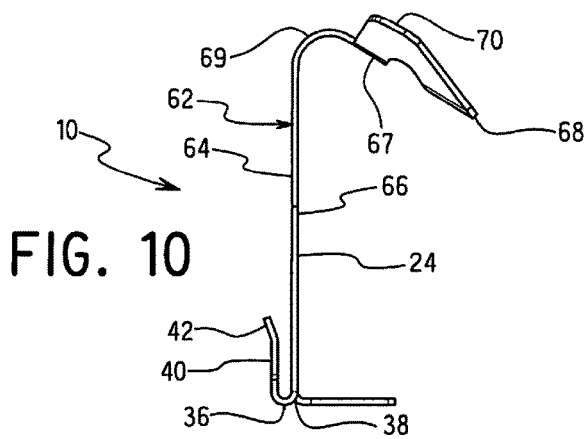
FIG. 10 is an end view of the support.
Figure 11:
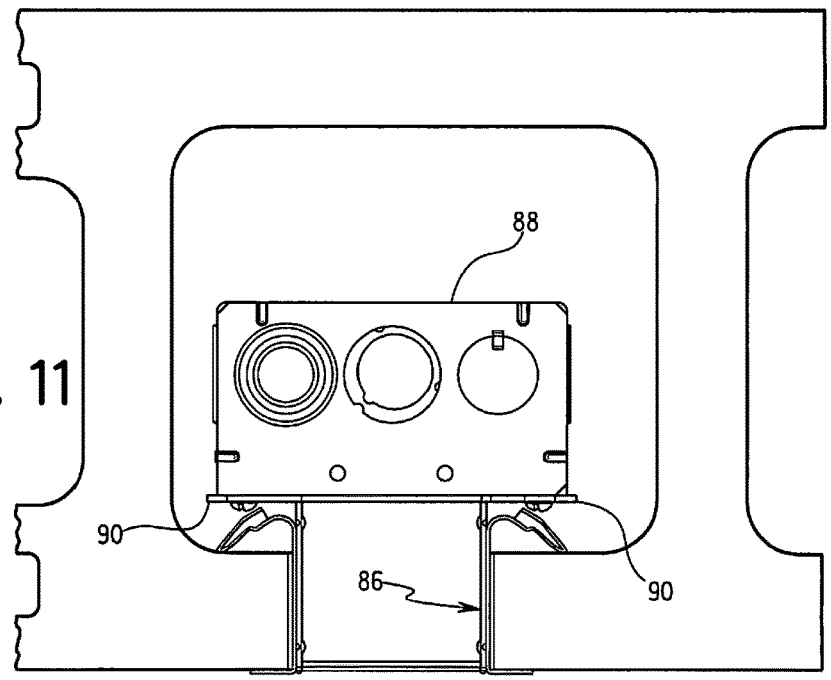
FIG. 11 is a top view of the electrical box and support in a second embodiment.

The body 24 has a spring member 62 for contacting the inner edge of the building block. In the embodiment shown, the spring member 62 is coupled to the rear side edge 32 of the body 24. Alternatively, the spring member 62 can be coupled to the front edge of the body 24 and positioned to extend away from the rear edge 32. In a preferred embodiment, two springs 62 are provided at each end of the rear side edge 32. Each spring 62 has a substantially U-shape and is formed by a first leg 64 having a first end 66 coupled to the rear side edge 32 of the body 24, and a second leg 67 having a second distal end 68. The legs 64 and 67 are connected by a connecting portion 69 as shown in FIG. 10. As shown in FIG. 10, the leg 64 is bent so that the distal end 68 forms a return and extends toward the flange 60 and the front side edge 30. The distal end 68 is preferably spaced from the flange 60 a distance to enable the flange 60 and the distal end 68 of the spring member 62 to frictionally engage the inner and outer surfaces of the building block. Preferably, the spring member 62 is formed from metal having sufficient resilience to spring bias the distal end 68 toward the flange 60 to position the electrical box with respect to the building block and secure the electrical box in place during construction and during use of the electrical box.

As shown in FIGS. 7-10, the end 68 of the leg 64 is formed with outwardly extending tabs forming guide members 70 extending away from the plane of the end 68 and the spring 62. The guide members are angled with respect to the leg 64 of the springs 62 at an angle sufficient to assist the ends 68 in sliding along the inner surface of the block during installation of the support 10.

In use, the support 10 is attached to the electrical box 12 by sliding the tabs 34 and the coupling tabs 50 of the support 10 onto the side walls 14 of the electrical box 12 so that the flange 60 is positioned at or near the front edge of the electrical box 12. The hooks 44 are snapped onto or under the inner edges of the mounting flanges 20 to secure the support to the electrical box and to prevent sliding of the support relative to the electrical box. In preferred embodiments, a support 10 is attached to each side of the electrical box 12 although in other embodiments a single support can be used depending of the location of the electrical box, the dimensions of the opening in the building block and the shape of the hollow cavity of the building block. Referring to FIG. 1, the assembly of the support 10 and the electrical box 12 is positioned into an opening 72 cut or formed into a building block 74 during construction of a wall. The building block 74 has a cavity forming a hollow core 76 with an outer wall 78 having an outer surface 80 and an inner surface 82.

In the embodiment shown, the opening 72 is cut along an edge to form the opening 72 with an open side. The assembly of the support 10 and the electrical box 12 slides into the opening 72 in the direction of arrow 84. During the installation, the flange 60 contacts the outer surface 80 of the block 74 and the distal end 68 of the spring 62 contacts the inner surface 82. The angled guides 70 enable the distal ends 68 of the spring 62 to slide along the inner surface 82 during installation. The spring 60 biases the distal end 68 to contact the inner surface 82 of the block 74 with sufficient force to retain the support 10 and the electrical box 12 in place during construction of a wall and to retain the electrical box in a fixed position during use of the electrical box and prevent separation and movement of the electrical box with respect to the block 74.

Figure 12:
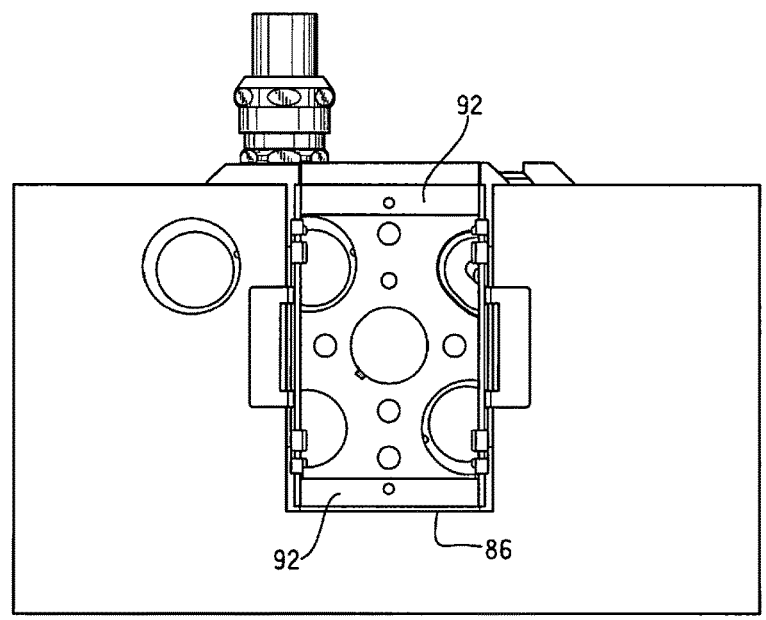
FIG. 12 is a front view of the electrical box and support of FIG. 11.

In the embodiment shown in FIGS. 1-10, the support 10 is attached directly to the side walls of the electrical box 12. In another embodiment shown in FIGS. 11 and 12, the support 10 is coupled an electrical box 88 having an extension collar 86 in substantially the same manner as in the embodiment of FIGS. 1-10. The collar 86 is attached to the electrical box 88 which has a dimension larger than the opening in the block. A cover plate 90 extending from the base of the collar 88 is attached to the open end of the electrical box 88. The collar 86 in the embodiment shown has a dimension for supporting an electrical wiring device and includes inwardly extending flanges 92 at the end wall 94 for fixing the hooks 44 of the support 10 to the open end of the collar 86 as shown in FIG. 12 in a manner similar to the previous embodiment.

Figure 13:
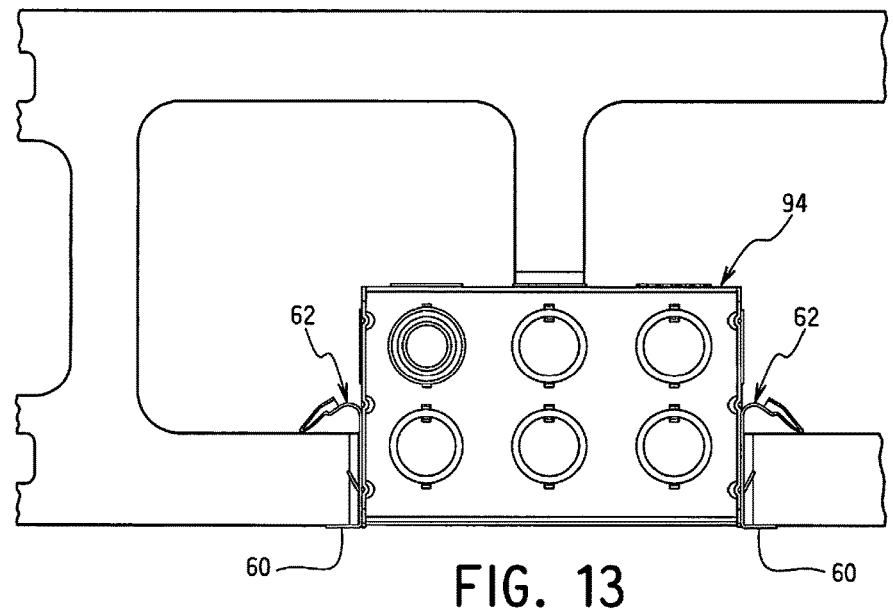
FIG. 13 is a top view of the electrical box and support in another embodiment of the invention.
Figure 14:
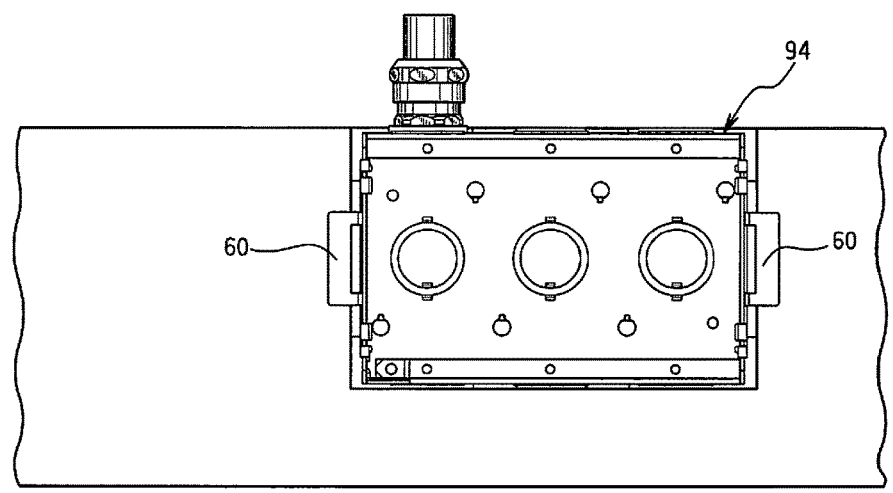
FIG. 14 is a front view of the electrical box and support of FIG. 13.
Figure 15:
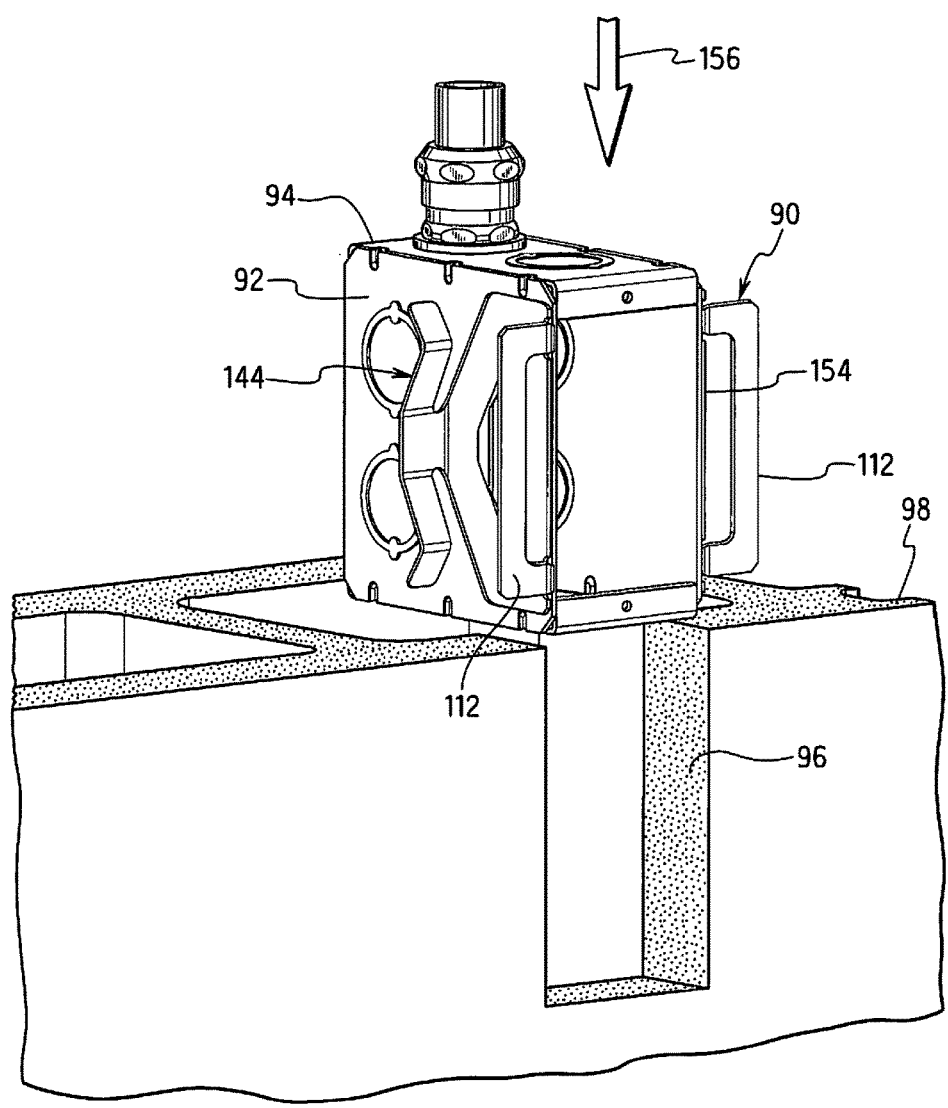
FIG. 15 is a perspective view of the electrical box and support in a second embodiment of the invention.
Figure 16:
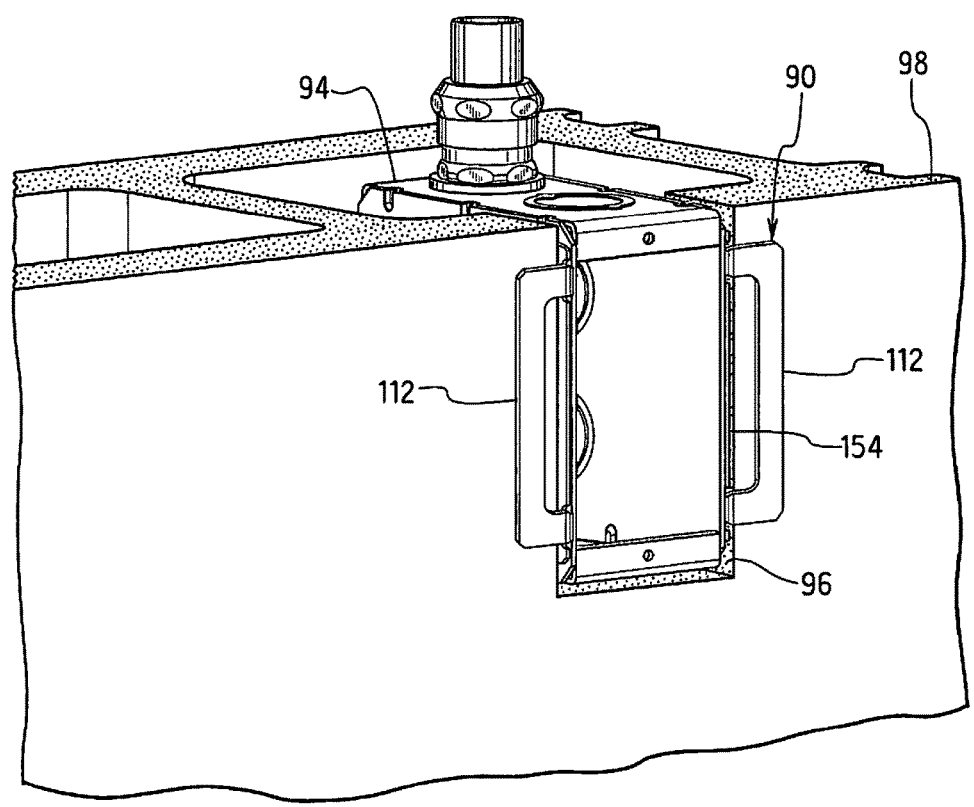
FIG. 16 is a perspective view showing the electrical box and support of FIG. 15 positioned in an opening in a building block.

In the embodiment of FIGS. 13 and 14, the electrical box 94 is shown as a three gang box for supporting a plurality of electrical devices. The construction of the electrical box 94 is substantially the same as the electrical box 12. The support 10 is attached to the electrical box 94 is the same manner as in the previous embodiment by the tabs and hooks 44.

In another embodiment shown in FIGS. 15-22, an electrical box support 90 is attached to the side walls 92 of an electrical box 94 as an assembly. The electrical box 94 and the support 90 are configured for sliding into an opening 96 formed in a hollow core building block 98 as in the previous embodiment.

The support 90 has a body 100 with a first longitudinal end 102, a second longitudinal end 104, a first side edge 106 and a second side edge 108. The body 100 has a substantially planar configuration for mating with the side wall 92 of the electrical box 94. In the embodiment shown, the body 100 is attached to the side wall 92 by spot welds at welding points 110 shown in FIG. 17 so that the support 90 is permanently fixed to the electrical box. In a preferred embodiment of the invention, the support 90 is formed from metal as a one piece integral unit formed by cutting and stamping the sheet metal blank enfolding various portions of the blank to form the support.

The first longitudinal edge 106 of the body 100 includes a flange 112 that extends substantially perpendicular to the plane of the body 100. The flange 112 is coupled to the body by a fold line 114 defining a frangible portion so that the flange 112 can be separated from the body by folding the flange along the fold line and breaking the fold line 114 when it is desirable to separate the flange. The body 100 is provided with recessed cutouts 116 adjacent the connecting point of the flange 112 to assist in breaking the flange from the body. In the embodiment shown, the flange 112 includes a main portion 118 with legs 120 coupled to the body 100 can be easily separated from the body 101 desired. The flange 112 has a dimension to contact the outer surface of the block 98 as shown FIG. 16 to support and position the electrical box within the opening 96 and so that the open end of the electrical box is substantially flush with the outer face of the block 98.

Referring to FIG. 17-21, a tab 122 extends from the body 100 at an incline with respect to the plane of the body 100. In one embodiment as shown, the tab is coupled to the second side edge 108 and is integrally formed with the body 100. The tab 122 is coupled to the body 100 along a connecting fold line 124 at the longitudinal ends of the tab 122. Tab 122 has an outer edge 126 spaced from the body 100 so that the tab 122 is positioned between the flange 112 and the spring member 128. The tab 122 is spring biased outwardly with respect to the body 100 and is oriented to contact the side surface of the opening 96 in the block 98. In the embodiment shown in FIGS. 15 and 16, the tabs 122 of the support 90 contact the opposite sides of the opening 96 to center the electrical box 94 within the opening 96. Preferably, the tabs 122 are spring biased outwardly to contact the surfaces of the opening to assist in retaining the electrical box within the opening during construction and to center the electrical box within the opening.

Figure 22:
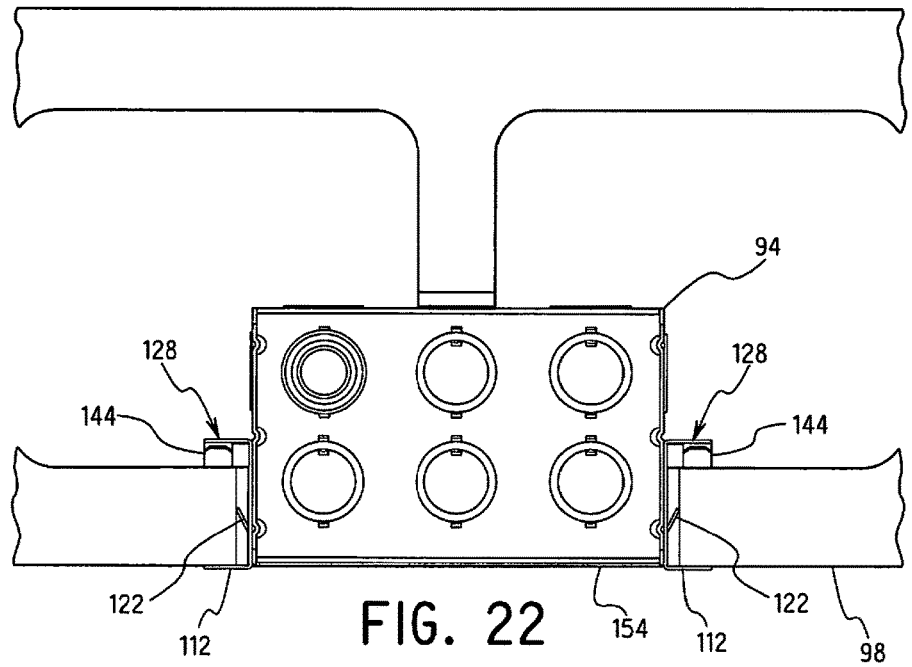
FIG. 22 is a top view showing the support and electrical box position in the building block.
Figure 23:
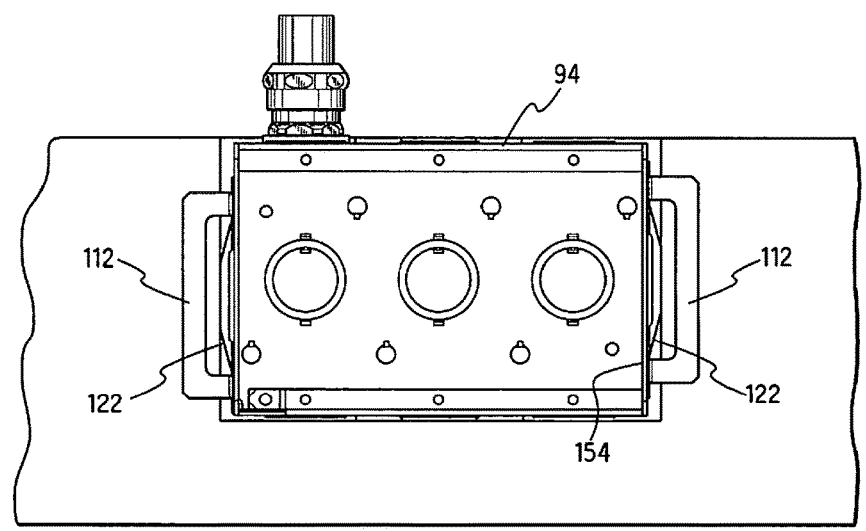
FIG. 23 is a front view showing the electrical box positioned in the building block.

The spring member 128 is formed to contact the inner surface of the hollow core block 98 as in the previous embodiment and as shown in FIGS. 10, 22 and 23. The spring member 128 is coupled to the body 100 along the second side edge 108 as shown FIG. 17-20, the spring member 128 has a first end 130 coupled to the second side edge 108 of the body 100 to contact end 132 spaced from the flange 112 the distance to capture the side wall of the building block 98 between the flange and the contact end of the spring member 128.

The spring member 128 is formed by a first leg 134 and a second leg 136. The first leg 134 has an inner end coupled to the body 100 by a fold line 138 and an outer end 140. Preferably, the first leg 134 is spring biased with respect to the body 100. In the embodiment shown, the first leg 134 has a substantially V-shaped configuration extending from the body 100 so that the respective legs of the V-shape are coupled to the body 100 by the fold lines 138. The first leg 134 is angled at an incline with respect to the body 100 and extends outwardly from the body 100 and away from the flange 112 as shown in FIG. 21. The second leg 136 extends from the outer end 140 of the first leg 134. In the embodiment shown, the second leg 136 is oriented substantially perpendicular to the plane of the first leg 134 and extends in the direction generally towards the flange 112.

The second leg 136 includes contact arms 144 defining guide members to contact the inner surface of the building block 98 and to assist in guiding the electrical box and support into the opening 196 in the block 98. The contact arms 144 are formed by a first section 146 extending at an incline with respect to the second leg 136 towards the flange 112. The first section 146 has a distal end 148 defining a contact end surface of the spring 128. A second section 150 of the contact arm 144 extends from the distal end 148 at an incline with respect to the plane of the first section 146 and extends away from the flange 112 to form the contact arm 144 with a substantially V-shape. In the embodiment shown, the spring member 128 is provided with two contact arms 144 extending in opposite directions from the second leg 136 to form the contact surfaces of the spring member 128 with the inner surface of the block 98. The contact arms 144 are preferably spring biased with respect to the second leg 36 along the fold line 152 between the side edges of the second leg 136 and the end of the first section 146 of the contact arms 144. The contact arms 144 are spring biased toward the flange 112 to engage the inner face of the block as shown in FIG. 22.

The support 90 in the embodiment shown is attached to the electrical box by welding or other suitable fastening means so that the flange 112 is positioned at the open end 154 of the electrical box 94 as shown in FIG. 22. The electrical box and the support 90 are positioned in the opening 96 of the block 98 by sliding the electrical box and support into the opening in the direction of arrow 156 shown in FIG. 15. The contact arms 144 of the support 90 contact the inner surface of the block 98 while the flange 112 contacts the outer surface of the block as shown in FIG. 22. The spring biased tabs 122 projects outwardly from the body 100 to contact the inner edges of the opening 96 to position the electrical box 94 within the opening 96. As shown in FIG. 22, the tabs 122 preferably position the electrical box in substantially the center of the opening 96. The contact arms 144 are biased towards the flange 112 to capture the wall of the block 98 between the contact arms 144 and the flange 112. The support 90 positions the electrical box within the opening of the block during construction of a wall or other structure. Cement or mortar used in the construction of the wall can be used to fix the position of the electrical box and support within the opening 96. Once the mortar is set, the flanges 112 can be removed by bending along the fold line 114. The flanges 112 can be removed to avoid interference with the electrical components mounted within the electrical box and faceplates or other devices mounted to the opening of the electrical box.

While various embodiments have been shown, it will be understood that various changes and modifications can be made without departing from the spirit and scope of the invention as defined in the appended claims.

What is claimed is:

1. A support for mounting an electrical box on a support structure, the support comprising:
    a body configured to be coupled to the electrical box;
    a flange coupled to the body and extending substantially perpendicular to a plane of the body and configured to be parallel to an outer edge of the electrical box, the flange integrally formed with the body and configured to contact the support structure; and
    a biasing member coupled to the body and including a contact end extending toward the flange, the biasing member biased toward the flange to capture a portion of the support structure against the flange.

2. The support of claim 1, wherein the biasing member includes a first guide member and a second guide member, the first guide member extending along an inclined plane away from the contact end in a first direction, the second guide member extending along an inclined plane away from the contact end in a second direction.

3. The support of claim 2, wherein each of the first guide member and the second guide member includes a first portion and a second portion extending from the first portion, the second portion forming an inclined plane relative to the first portion.

4. The support of claim 3, wherein each second portion is spring biased with respect to the associated first portion.

5. The support of claim 1, further comprising at least one tab extending from an edge of the body and configured to engage a side wall of the electrical box adjacent an open end.

6. The support of claim 5, wherein each tab includes a side edge and a hook projecting outwardly for engaging the electrical box.

7. The support of claim 1, wherein the biasing member is a first biasing member positioned proximate a first end of the body, and
    further comprising a second biasing member positioned proximate a second end of the body, the second biasing member including a contact end extending toward the flange and biased toward the flange to capture a portion of the support structure against the flange.

8. The support of claim 1, wherein the flange is removably coupled to the body by a frangible portion.

9. The support of claim 1, further comprising a spring-biased tab extending from the body for contacting a side surface along an opening in the support structure, the tab positioned between the flange and the contact end of the first biasing member.

10. An electrical box assembly comprising:
    an electrical box having a first side wall, a second side wall, and an opening positioned between an edge of the first side wall and an edge of the second side wall; and
    a support coupled to one of the first side wall and the second side wall, the support including,
        a body,
        a flange coupled to the body and extending substantially perpendicular to a plane of the body and configured to engage a support structure, the flange extending in a direction substantially parallel to the edges of the first wall and the second wall, the flange integrally formed with the body, and
        a biasing member coupled to the body and including a contact end extending toward the flange, the biasing member biased toward the flange to capture a portion of the support structure against the flange.

11. The assembly of claim 10, wherein the support further includes a tab having a having a first end engaging the edge of the one of the first side wall and the second side wall.

12. The assembly of claim 11, wherein the tab includes a side edge and a hook projecting outwardly with respect to the first end for engaging the electrical box.

13. The assembly of claim 12, wherein the electrical box includes an inwardly extending flange positioned adjacent the opening, the hook engaging the flange to secure the support relative to the electrical box.

14. The assembly of claim 10, wherein the biasing member includes a first guide member and a second guide member, the first guide member extending away from the contact end and defining a first guide surface, the second guide member extending away from the contact end and defining a second guide surface.

15. The assembly of claim 14, wherein each of the first guide member and the second guide member includes a first portion and a second portion extending from a distal end of the first portion, the second portion forming an inclined plane relative to the first portion.

16. The assembly of claim 15, wherein each second portion is spring biased with respect to the associated first portion.

17. The assembly of claim 10, wherein the biasing member is a first biasing member positioned proximate a first end of the body, and
    the support further including a second biasing member positioned proximate a second end of the body, the second biasing member including a contact end extending toward the flange and biased toward the flange to capture a portion of the support structure against the flange.

18. The assembly of claim 10, wherein the flange is removably coupled to the body by a frangible portion.

19. The assembly of claim 10, wherein the support further includes a spring-biased tab extending from the body for contacting a side surface of the support structure, the tab positioned between the flange and the contact end of the first biasing member.

* * * * *